United States Patent Office 3,339,707
Patented Sept. 5, 1967

3,339,707
MATERIAL HANDLING APPARATUS
Carl Ludwig, Cleveland, Ohio, assignor to McDowell-Wellman Engineering Co., Cleveland, Ohio, a corporation of Ohio
Filed Feb. 4, 1966, Ser. No. 525,209
11 Claims. (Cl. 198—77)

The present invention relates generally to improvements in bulk material handling apparatus and more particularly to such apparatus having a boom pivotally mounted on a shuttle carriage which is movable relative to the support for the boom suspension means. One important application of the present invention is in apparatus used to load and unload bulk cargo vessels having relatively deep and wide holds.

In large installations of this type of apparatus problems are often encountered which, though present to a degree in smaller installations, do not become serious because of the relative size and limited movement of the smaller apparatus. For example in apparatus of the present type employing a boom suspended digging means for reclaiming bulk material from a pile or a container such as the hold of a ship, the problem of maintaining a uniform depth of cut becomes serious when the length of the cut is relatively long. The problem arises as the boom carriage moves inwardly to traverse the material with the digging means, because unless some provision is made for shortening the length of the boom suspension means and maintaining a substantially constant boom slope, i.e. to level luff the boom, the boom slope will increase causing the digging means to lower.

With long boom reaches, the boom must be counterweighted to facilitate its being raised and lowered. To obtain sufficient vertical distance from the counterweight to operate in either a counterweight pit or a relatively tall tower or mast structure must be provided.

As the boom is raised from a lowered position, the required counterweight effort decreases and unless the counterweight effort is reduced before the boom reaches a certain point the counterweight will overhaul the dead load of the boom and wreck the apparatus.

Because of the long boom reach, wind loads and varying seismic conditions prevailing in certain geographic locations also present serious problems. These changing forces tend to act directly between the boom and the supporting structure causing sudden rversals in the forces acting on these members.

To overcome these problems, the present invention utilizes a unique combination of features. Level luffing of the boom is accomplished by an electrical control circuit including a resistance bridge which senses any change in the boom slope and activates the boom hoist machinery to either raise or lower the boom to maintain a substantially constant boom slope.

The vertical travel of the counterweight has been reduced by reeving the suspension cables for the counterweight through the counterweight pulley blocks a greater number of times than the boom hoist cables are reeved through the boom pulley blocks. While this requires the use of a heavier counterweight than would be required to produce the same counterweight effort if the cables were reeved through both pulley block systems the same number of times, shortening of the distance between the pulleys of the boom block arrangement by a given amount lowers the counterweight through a substantially smaller vertical distance than that moved by the loom pulley blocks.

Overhauling of the boom by the counterweight has been prevented by splitting the counterweight into a number of weights and setting off the heaviest weight onto a support prior to the overhaul point of the boom travel as the boom is being raised. By using springs to support the set off counterweight the shock loads on the hoisting machinery are greatly reduced.

The effect of sudden reversals in the forces acting on the boom pivot supporting carriage has been minimized by using long shuttle screws to drive the shuttle carriage. These screws provide a rigid drive means and are less complicated than a cable arrangement. The screws permit the forces on the carriage to change from tension to compression without adversely affecting the position of the carriage.

An important object of the present invention is to provide a novel bulk material handling apparatus particularly adapted to utilize a long boom reach with a maximum degree of efficiency.

Another object of the present invention is to provide a novel bulk material handling apparatus having a shuttle carriage mounted boom wherein the effects of changing wind and seismic loads upon the boom and shuttle carriage is minimized.

Another important object of the present invention is to provide a novel bulk material handling apparatus having a compact boom counterweight system which will not overhaul the boom deadload as the boom is being raised and which will not interfere with the accessory equipment of the apparatus.

A still further object of the present invention is to provide a shuttle mounted boom which will maintain a substantially constant slope as the pivot point of the boom moves relative to the boom suspension support means.

Further objects and advantages will become apparent from the following detailed description of the preferred embodiment of the present invention which is illustrated in the acompanying drawings.

Figures 1, 2:
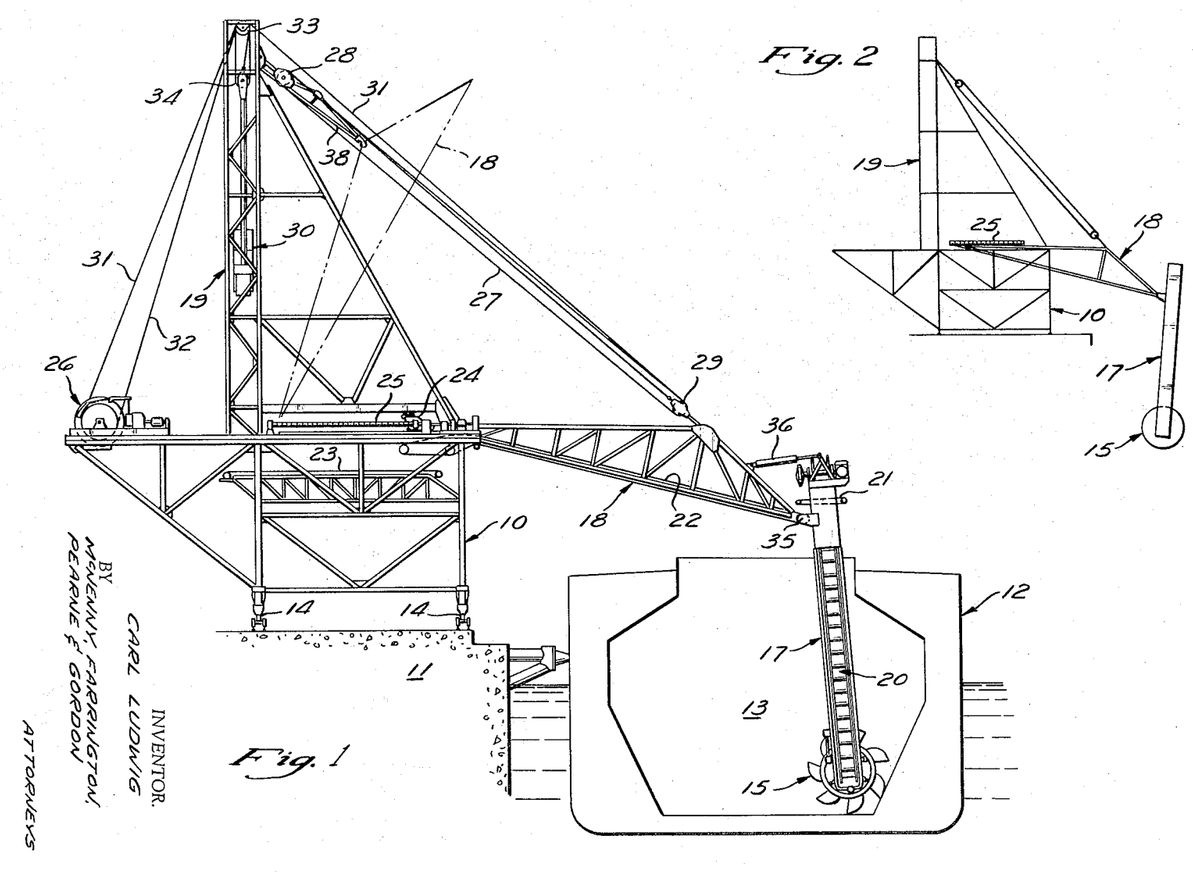
FIGURE 1 is an elevational view of a ship unloader incorporating the present invention.
FIGURES 2-6 are schematic representations showing the various positions of the boom.

The illustrated embodiment shows the principles of the present invention incorporated in a dockside unloader for large deep draft bulk cargo vessels. Generally the unloader includes a structural tower 10 mounted on trucks 14 adapted to move along a dock 11 lengthwise of a vessel 12 from one hold 13 to another for a distance of several holds.

The bulk material is scooped from the hold by a bucket leg elevator having a digging or reclaiming wheel 15 rotatably mounted on the lower end of a ladder 17. The ladder 17 is suspended from a boom 18 extending outwardly from the tower 10. The wheel 15 deposits the bulk material into an endless bucket chain elevator 20 running through the center portion of the wheel 15 and forming a closed conveyor circuit extending from the bottom to the top of the ladder 17. At the top of the ladder 17 the material is dumped onto a short first conveyor belt 21 which transfers it to a second conveyor belt 22 extending along the boom 18. The second conveyor 22 transfers the material to a third conveyor belt 23 in the tower 10 from which it is transferred to suitable material handling apparatus (not shown) on the dock 11. The digging wheel and bucket leg elevator form no part of the present invention except as described herein and may be constructed according to my copending application Ser. No. 524,404, filed Feb. 2, 1966.

Figure 10:
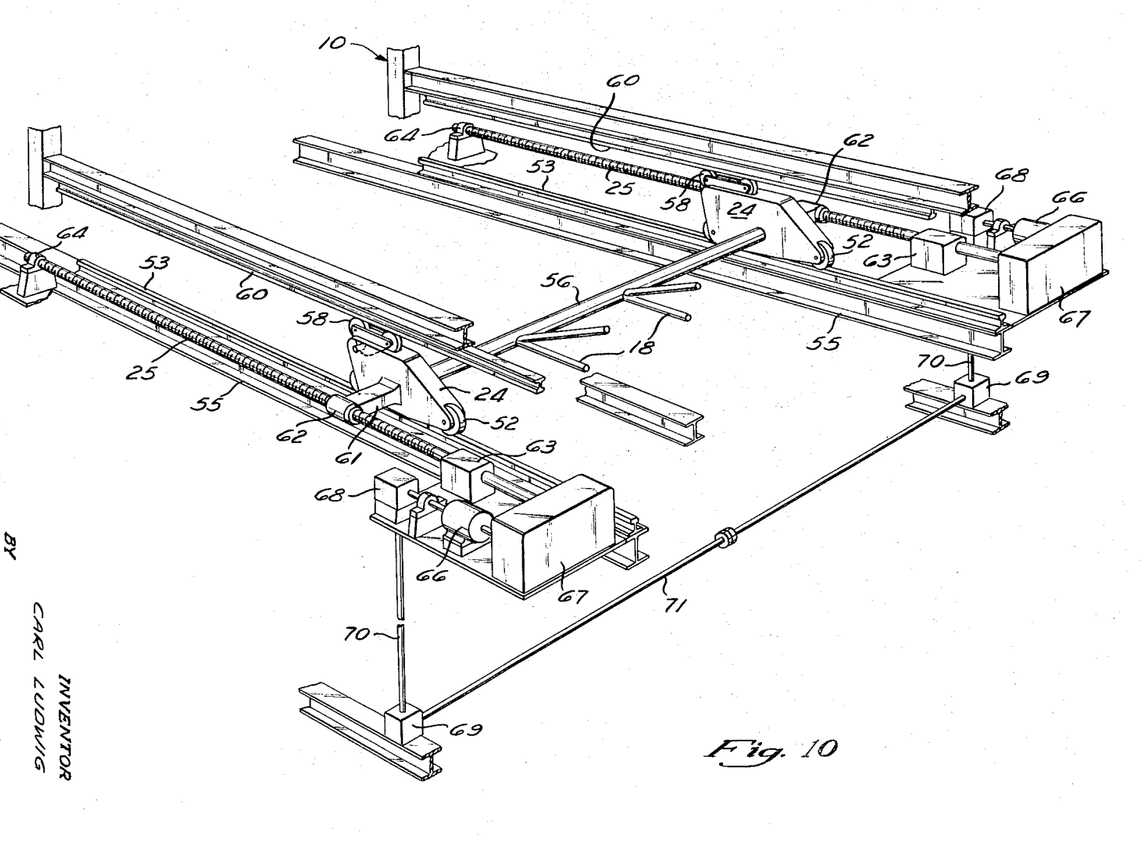
FIGURE 10 is a schematic perspective view of the drive system for the boom shuttle carriages; and, FIGURE 11 is an electrical schematic diagram of the boom level luffing control system.

In order to shift the digging wheel 15 and the ladder 17 across the ship from one side of the hold to the other, the inner end of the boom is pivotally connected to a pair of shuttle carriages 24 which are moved perpendicular to the length of the vessel by a pair of long shuttling screws 25 (see FIGURE 10). The boom is supported at its outer end by cables from a mast 19 on tower 10.

The boom 18 is raised and lowered by a drum type hoist 26 through a set of hoist cables 31 passing over an idler sheave nest 33 at the top of the mast 19 and reeved at 27 through a set of upper and lower boom pulley blocks 28 and 29. The boom 18 is counterbalanced by a split counterweight assembly 30 also connected to the boom hoist 26 through a set of cables 32 reeved through the idler sheave nest 33 and counterweight pulley block 34.

To maintain the orientation of the ladder 17 relative to the ship as the boom is raised and lowered, the upper end of the ladder 17 is pivoted about the point 35 on the outer end of the boom by tilt cylinders 36.

The various working and stowed positions of the boom and ladder are schematically illustrated in FIGURES 2–6.

FIGURE 2 shows the boom in its maximum in and down position with the boom pivot at the inner end of the shuttling screws and the boom below the horizontal at an angle of 14°. This is the lowest retracted position at which the digging wheel operates and is generally the position wherein the digging wheel is scraping the bottom of the hold at the side adjacent the dock.

Figures 3, 4:
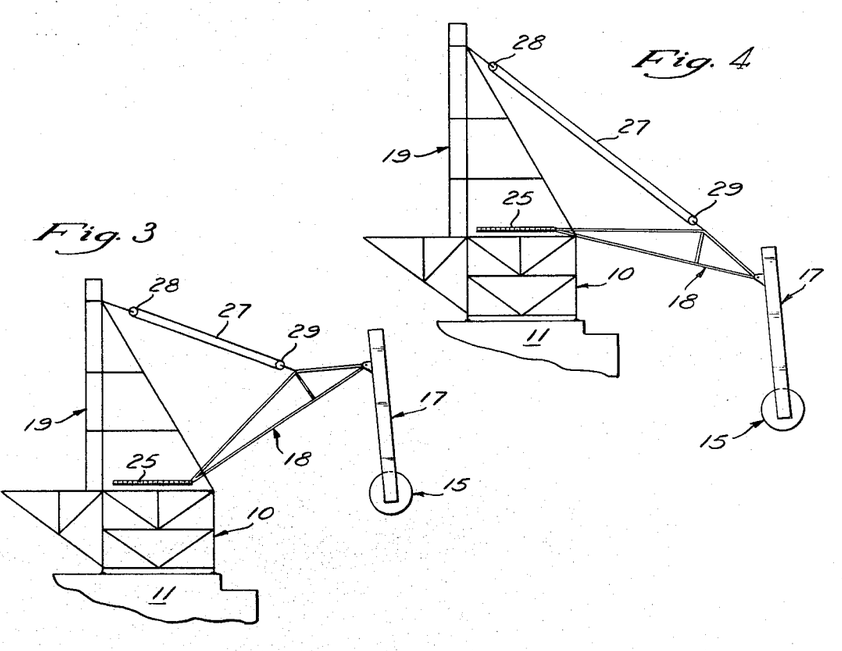

FIGURE 3 shows the highest extreme working position wherein the boom pivot is at the outer end of the shuttling screws and the boom is raised to an angle above the horizontal of about 30°. This is the position in which the digging wheel begins a cut into the material in the hold.

FIGURE 4 shows the boom in its maximum out and down position with the boom pivot at the outer end of the shuttling screws and the boom below the horizontal at an angle of about 14°. This is the lowest extended position at which the digging wheel operates and is generally the position wherein the wheel is scraping the bottom of the hold at the side away from the dock.

Figure 5:
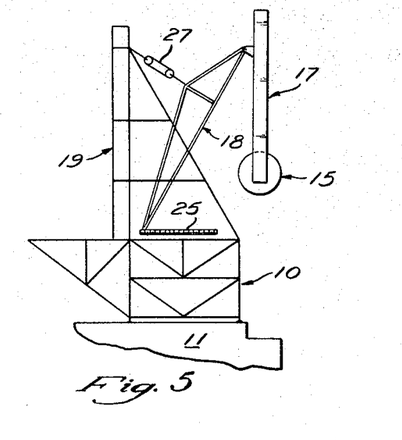

FIGURE 5 represents the normal stowed position for the boom and ladder. In this position the boom pivot is at the inner end of the shuttling screws and the boom is raised at an angle above the horizontal of about 60°. The boom is secured in this position by a boom latch 38 shown in FIGURE 1.

Figure 6:
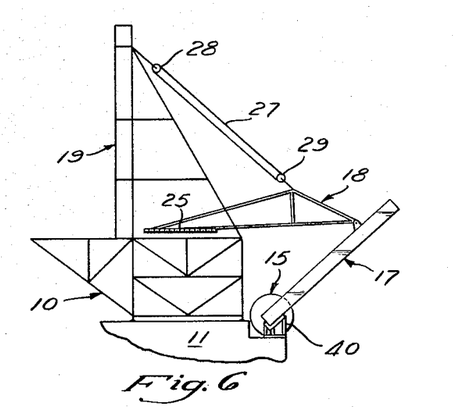

FIGURE 6 shows the maintenance or hurricane stowed position wherein the boom pivot is at the inner end of the shuttling screws and the boom is substantially horizontal. In this position the digging wheel 15 rests directly on the dock in a portable dock rack 40.

The counterweight system

Raising of the boom 18 is aided by the vertically travelling counterweight assembly 30. The boom hoist cables 31 and the counterweight cables 32 are both wound upon the drum of the hoist 26 in such a manner that as the boom hoist cables are wound onto the drum, the counterweight cables are concurrently unwound from the drum so that the cables 31 and 32 move in opposite directions at the same speed. To reduce the vertical travel of the counterweight and eliminate the need for a counterweight pit without having the mast 19 extensively high, an arrangement is used which permits the counterweight to be contained within the mast portion 19 of the tower 10 without interfering with the conveyor system by using a split counterweight having a travel less than that of the lower boom pulley block.

This is accomplished by reeving each of the boom hoist cables 31 about the upper and lower boom blocks 28 and 29 by eleven parts of line and reeving each of the counterweight cables 32 about the idler sheave nest 33 and counterweight pulley block 34 by fifteen parts of line. While this reeving arrangement requires the use of a heavier counterweight assembly 30, the counterweight travels only $11/15$ of the boom block travel and permits the counterweight assembly to be completely contained within the vertical mast portion 19 of the tower 10.

Figure 7:
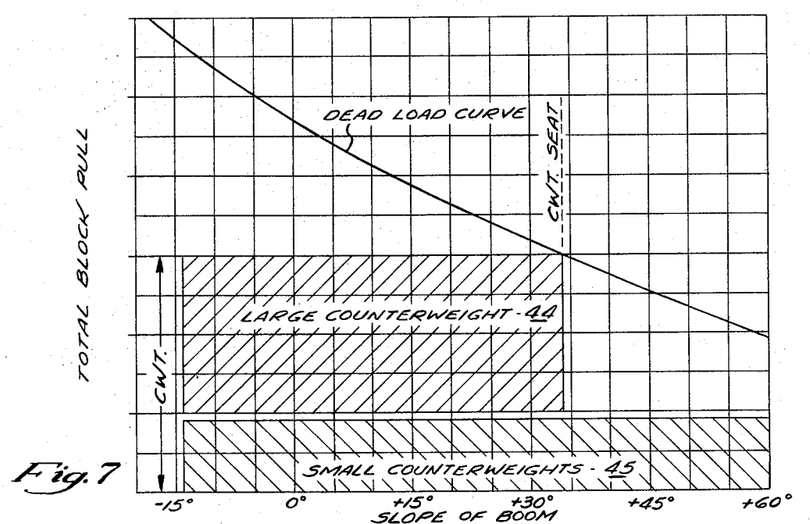
FIGURE 7 is a graph of the boom slope v. the total boom block loads showing the total counterweight effort for the counterweights of the split counterweight system in relation to the dead load on the boom.

When the unloader is working, the boom positions range from a low of 14° below the horizontal to a high of 30° above the horizontal. Throughout this working range, the boom hoist action is counterbalanced up to about 60% of the maximum boom block load by the counterweight assembly 30 as shown by the chart in FIGURE 7. As the boom is raised toward the normal stowed position at about 60° above the horizontal the boom block load is decreased to around ⅓ that of the load at the low position of 14° below the horizontal because of the decreasing effective lever arm length of the boom. Before this position is reached the total counterweight effort (cwt.) becomes greater than the boom dead load and if the boom were raised beyond this position the counterweight effort would overhaul the boom dead load and wreck the machine unless the counterweight effort is reduced before the boom reaches this position.

This problem is overcome by splitting the counterweight into two working sections. The first section comprising a single large weight 44 which is set off on a support 48 prior to the point at which it might overhaul the boom dead load. The second section includes two smaller weights 45 which descend past the support 48 as the boom is raised to the positions shown in phantom in FIGURES 8 and 9. By splitting the counterweight in this manner, the counterweight assembly does not interfere with the conveyor belt 23 because the large weight 44 is set off above the conveyor while the two smaller weights 45 pass on either side of it.

Figure 8:
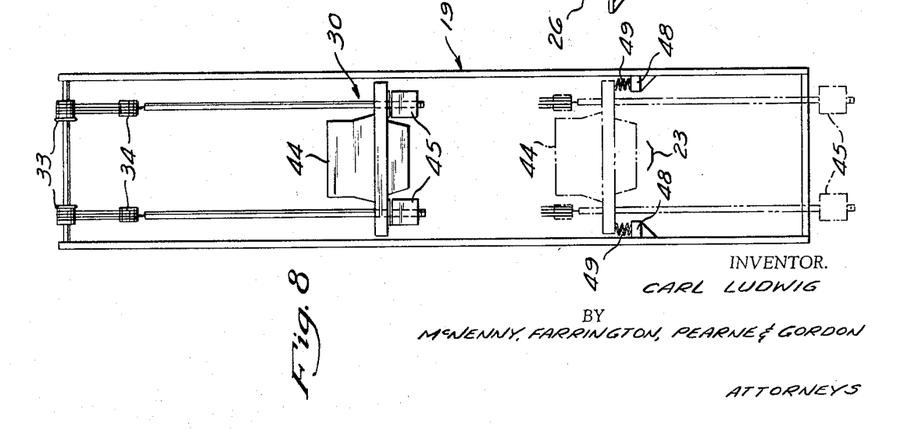
FIGURE 8 is a schematic end view of the tower showing the counterweights of the split counterweight system in two positions.
Figure 9:
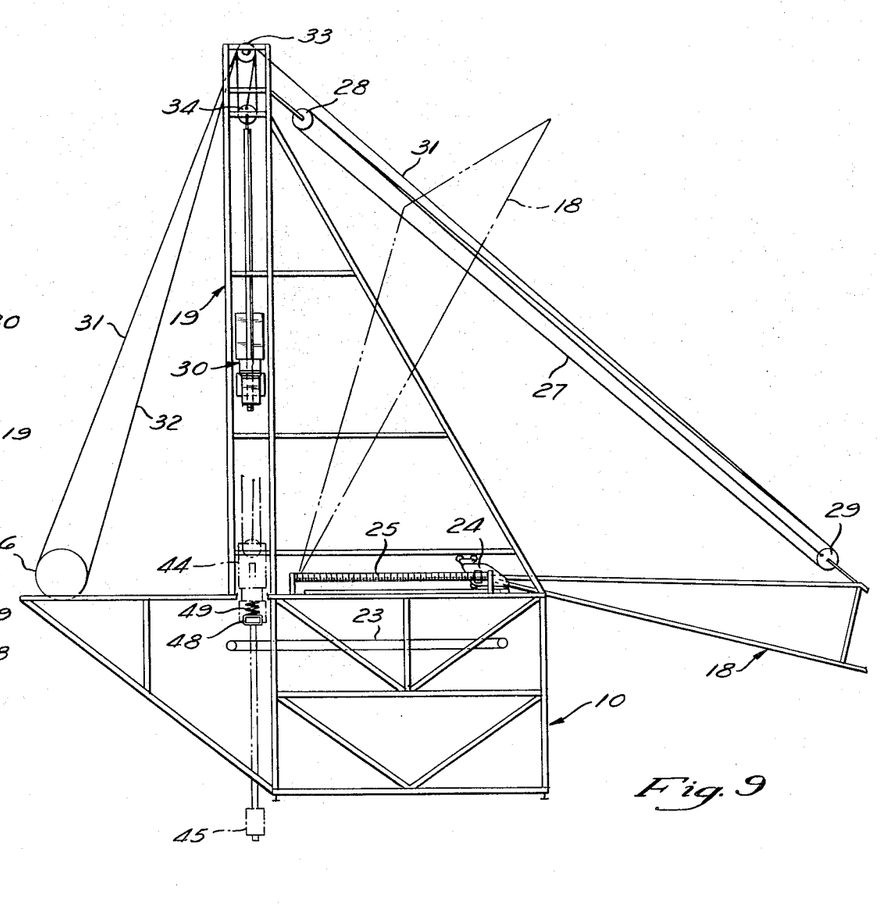
FIGURE 9 is a schematic side elevational view of the tower showing the relationship of the counterweight system to the boom.

Because the large weight 44 is relatively heavy in comparison with the rest of the counterweight assembly, it is seated upon a pair of snubber spring 49 which perform two functions. First, as the boom 18 is raised they absorb the seating shock of the descending large weight 44 to prevent excessive impact loading of the support 48. Second, as the boom 18 is lowered, they assist in accelerating the weight 44 as it is lifted off of the support 48 to avoid excessive shock loads to the hoisting machinery.

The shuttle carriage system

The boom 18 is moved crosswise of the ship's hold by a pair of shuttle carriages 24 mounted on wheels 52 which roll along rails 53 on a structural member 55 of the tower 10. As shown in the schematic of FIGURE 10, the inner end of the boom 18 has a shaft 56 which is pivotally mounted on the carriages 24.

Each carriage 24 is also provided with a pair of upper rollers 58 engaging an upper rail 60 to prevent the carriages from lifting due to the vertical forces generated by the pivoting boom. In this manner, each carriage is confined between the spaced parallel rails 53 and 60.

Each of the carriages 24 is connected to one of the shuttle screws 25 by a projecting arm 61 having a fixed nut 62 at its outer end through which the screw 25 is threaded. As the screws turn, the carriages move along the rails 53 and 60 to shift the boom pivot point.

Because the boom 18 is relatively large, it originates relatively high lateral wind loads and varying seismic loads. These forces are transmitted through the boom directly to the shuttle carriages 24. Therefore, the drive arrangement for the carriages must be able to withstand sudden force reversals i.e., from an inshore to an outshore force or vice versa. To overcome this problem the carriages 24 are driven by a pair of long shuttle screws 25 which are able to take both tension and compression loads. The length to diameter ratio for the screws 25 is such that the screws will not buckle under their own weight or when subjected to compression loads generated by the wind and seismic conditions in the area.

A constant tension force is maintained on the screws 25 in the absence of wind and seismic forces by locating the pivot point of the boom 18 with respect to the rest of the boom in such a manner that a prevailing inshore force is exerted on the carriages.

A thrust bearing assembly 63 located at the outer end of each screw resists the end thrust forces in both axial directions exerted on the screw 25. Since all of the axial loads on the screws are taken by the thrust bearing assemblies 63, the inner ends of the screws are supported only by radial bearings in pillow block assemblies 64.

Each of the shuttle screws 25 is driven by its own drive unit, each of which includes an electric motor 66 connected to the screw 25 through a gear reduction unit 67. The speeds of the two screws are synchronized by interconnecting the motors 66 with an equalizing system. The equalizing system includes four interconnected bevel gear units. Each of the motors 66 is connected to a first bevel gear unit 68 which in turn is connected to a second bevel gear unit 69 by a vertical shaft 70. The second bevel gear units 69 for the two motors are interconnected by a horizontal shaft 71 extending across the tower at a point below the conveyor 23 where it does not interfere with the boom 18 when it is in the full inshore and down position as shown in FIGURE 2.

The level luffing system

As the shuttle carriages 24 move the boom pivot point in and out on the tower 10, it is necessary to adjust the boom hoist cables 31 in order to maintain a level path for the digging wheel. Otherwise, unless the boom hoist cables are shortened between the boom pulley blocks 28 and 29 as the boom shuttle carriages move inshore, the boom will lower causing the wheel to make a progressively deeper cut into the material. To avoid this and provide for automatic level luffing of the boom, a control circuit is used which automatically coordinates the hoist drive with the shuttle carriage drive to maintain a constant preselected boom angle.

Figure 11:
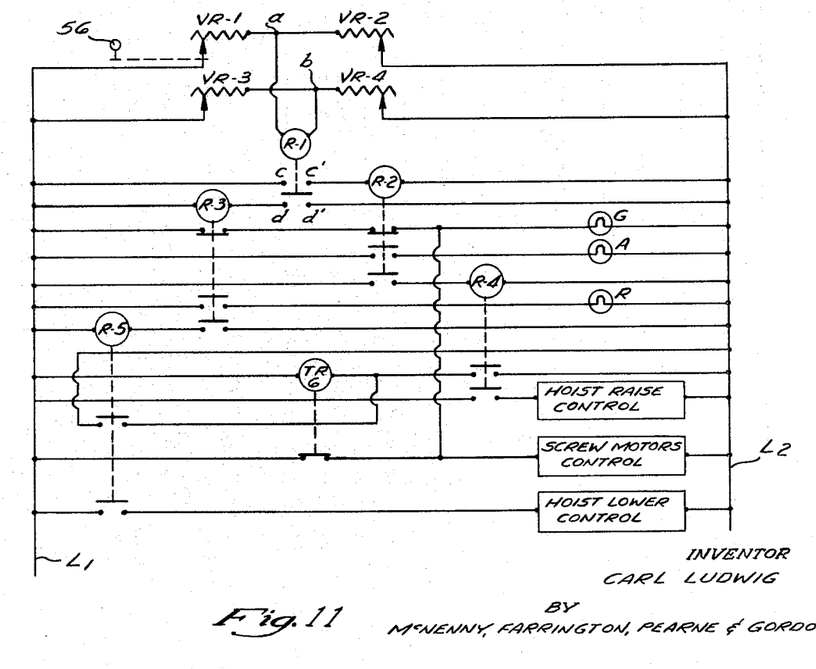

Referring now to FIGURE 11, the level luffing control system generally comprises a resistance bridge and six relays. The resistance bridge includes four variable resistors VR-1, VR-2, VR-3, and VR-4 forming a four leg bridge, with a polarized relay R-1 connected across points $a$ and $b$ of the bridge and direct current supplied through lines $L_1$ and $L_2$ to the other corners. The resistors VR-1 and VR-2 comprise one side of the bridge and the resistors VR-3 and VR-4 comprise the other side of the bridge.

VR-1 is a 360° rheostat connected to the boom pivot shaft 56 through a chain or gear train. VR-3 is an adjustable rheostat which is manually set by the operator to determine the desired boom angle. VR-2 and VR-4 are permanently calibrated vernier balancing rheostats. R-1 is a polarized relay which is normally open when the bridge circuit is in balance i.e. when the resistance setting of VR-1 equals VR-3 so that the potential across points $a$ and $b$ is zero.

With the digging wheel at the desired depth for a cut the operator utilizes the level luffing system by first setting the resistance of the rheostat VR-3 to match the resistance of the boom pivot connected rheostat VR-1. At this setting the potential across points $a$ and $b$ is zero and the polarized relay R-1 is in its normal or open position which is indicated by a green light G energized through the normally closed contacts of relays R-2 and R-3. At this visual signal, the operator starts the shuttle screws and hoist motors at normal speeds and begins the unloading operation at the level for which the boom slope has been set.

As the boom pivot point moves inshore on the shuttle carriages 24, if the hoist rate is too low, the boom slope increases lowering the wheel 15. As the wheel lowers, the boom pivot shaft 56 rotates changing the resistance of the rheostat VR-1 and unbalancing the bridge. Whereupon, the polarized relay R-1 is energized in the direction to close the contacts $c$ to $c'$ energizing the relay R-2. When this takes place, the green light G goes off and an amber light A comes on. At the same time relay R-4 is energized activating the hoist raising control to speed up the hoist 26 and energizing a timing relay TR-6. Under most circumstances, the control circuit will have sufficient sensitivity to unbalance, as determined by the values of the resistances VR-2 and VR-4, that the boom will not have to move so far in either direction that it will not be able to return to the desired position before the elapse of the pre-set time delay of relay TR-6. In this case, rebalancing of the bridge causes relay R-1 to drop out deenergizing relays R-2 and R-4 in turn.

Normally the increase in speed of the hoist 26 will move the boom back to the desired angle, but in the event that the speeds of the shuttle screws and hoist motors is so high that the desired angle is not attained within a predetermined time, the time delay relay TR-6 will deenergize the shuttle screw drive to stop the screw travel until deenergization of relay R-1, when the bridge is again balanced by having the boom return to the predetermined angular position, causes relay R-2 to deenergize, hence deenergizing relay R-4 and the time relay TR-6 in turn.

On the other hand, if the boom rises above the desired angle, either because of movement in the outward direction or because the hoisting movement takes place at a more rapid rate than that of the shuttle screws, the rotation of the boom pivot shaft in the opposite direction changes the resistance of the rheostat VR-1 to unbalance the bridge in the opposite direction so that the polarized relay R-1 is energized in the direction to close the contacts $d$ and $d'$. This energizes the relay R-3 to turn off the green light G and turn on the red light R. At the same time, relay R-5 is energized to actuate the hoist lowering control and the time delay relay TR-6. The boom will then be lowered toward the desired position until the relay R-1 again drops out when the bridge is balanced. The time relay TR-6 operates in the same manner as previously described to deenergize the shuttle screw drive only if the balance does not re-occur within the time delay setting of the relay TR-6.

It will be understood that during operation of the unloading apparatus, the digging wheel will be lowered to start digging at one side of the hold and both the shuttle screw drive and hoist drive will be energized at the same time to move the boom at the desired rate to make a cut at a uniform rate across the hold. Thus, the level luffing controls will come into operation automatically during the cut to maintain a constant boom angle even if the operator has not properly coordinated the speeds of the shuttle screw drive and the hoist drive.

While the illustrated embodiment of the invention has been described in considerable detail, it is to be understood that many rearrangements and modifications may be resorted to without departing from the scope of the invention as defined in the following claims.

What is claimed is:

1. In a hoisting apparatus a support means, a boom, means pivoting said boom relative to said support means, hoist means, means supported by said support means and connecting said hoist means to said boom, a movable counterweight assembly, means connecting said counterweight assembly to said boom to move said counterweight in response to movement of said boom, said counterweight assembly including a plurality of separable weights, a support member positioned in the path of movement of said counterweight assembly, at least one of said separable weights being constructed to contact and rest upon said support member when said boom is raised to a predetermined position, and snubber spring means disposed between said one separable weight and said support member to absorb the landing shock of said one of said separable weights and to assist in accelerating said weight as it is raised from said support member.

2. An apparatus as set forth in claim 1 wherein said apparatus includes a conveyor assembly passing through a point in line with the path of movement of said counterweight assembly and wherein said support member is located above said conveyor and the remainder of said separable weights pass to the side of said conveyor.

3. An apparatus as set forth in claim 1 wherein said means connecting said hoist means to said boom includes a pair of boom pulley blocks having a line reeved therebetween a given number of times and said counterweight assembly is suspended from a pair of counterweight pulley blocks having a line reeved therebetween a greater number of times than the line interconnecting said boom pulley blocks, the lines of said counterweight pulley blocks and said hoist means being so interconnected that a given relative movement of said boom pulley blocks produces a smaller relative movement of said counterweight pulley blocks.

4. An apparatus as set forth in claim 1 wherein the inner end of said boom is pivotally connected to carriage means shiftable relative to said support means.

5. A device as set forth in claim 4 wherein said support means includes screw means disposed parallel to the axis of movement of said carriage and said carriage means has means thereon adapted to engage and cooperate with said screw means to move said carriage upon rotation of said screw means.

6. An apparatus comprising a support means, carriage means movable relative to said support means, a boom pivoted adjacent one end on said carriage means, drive means for said carriage means, hoist means extending between said support means and said boom for raising and lowering said boom, and control means for sensing a change in the slope of said boom and activating said hoist means to maintain a substantially constant slope on said boom as said carriage means moves the pivot point of said boom relative to said support means, said control means including an electrical resistance bridge having two sides with a first resistance means on one side thereof variable in response to changes in the slope of the boom and a second resistance means on the other side thereof selectively variable in the direct relation to the desired slope for said boom, and a system of relays interconnected with said resistance bridge and said hoist means and said drive means whereby a change in the resistance of said first resistance means energizes said system of relays to regulate the speed of said hoist means and said drive means.

7. An apparatus comprising a support means, carriage means movable relative to said support means, a boom pivoted adjacent one end of said carriage means, drive means for said carriage means, hoist means extending between said support means and said boom for raising and lowering said boom, reversible hoist drive means for actuating said hoist means, and control means connected to said boom for sensing a change in the slope of said boom and activating said reversible hoist drive means to adjust said boom to maintain a substantially constant slope on said boom as said carriage means moves the pivot point of said boom relative to said support means, said control means including an electrical bridge having two sides with a first electrical means on one side thereof variable in response to changes in the slope of the boom and a second electrical means on the other side thereof selectively variable in direct relation to the desired slope for said boom.

8. Bulk material handling apparatus comprising a support, a mast fixedly mounted on said support and extending upward therefrom, a carriage mounted on said support at the lower end of said mast for horizontal movement along said support relative to said mast, drive means to shift said carriage along said support, a boom pivotally mounted at one end of said carriage, bulk material elevating apparatus depending from the other end of said boom, hoist means carried on said support at the lower end of said mast, an idler sheave nest assembly at the top of said mast, hoist cable means operable by said hoist means and extending over said idler sheave nest assembly and operably connected to said other end of said boom to raise and lower said boom, counterweight means carried by said mast operable to at least partially counterbalance the load of said boom, and counterweight operating means operable by said hoist means and including a cable extending over said idler sheave nest assembly for raising and lowering said counterweight, said counterweight assembly including a plurality of separable weights, a support member positioned at the path of movement of said counterweight assembly, at least one of said separable weights being constructed to contact and rest upon said support member when said boom is raised to a predetermined position and snubber spring means disposed between said one separable weight and said support member to absorb the landing shock of said one of said separable weights and to assist in accelerating said weight as it is raised from said support member.

9. Hoisting apparatus including a support frame, a carriage movably mounted on said support frame for movement along said support frame, a boom mounted adjacent one end on said carriage for pivotal movement about an axis perpendicular to the line of travel of said carriage along said support frame, drive means to move said carriage along said support frame including screw means on said support frame and nut means on said carriage, hoist means mounted on said support frame and operably connected to said boom to pivot one end of said carriage, and restraining means to prevent tipping of said carriage under the action of said boom including upper and lower parallel guide rail means on said support frame and cooperating guide follower rail means on said carriage including a first set of two roller means engaging one of said rail means at points spaced longitudinally therealong and a second set of roller means engaging the other of said rail means.

10. An apparatus as set forth in claim 9 wherein said screw means includes a pair of parallel screws.

11. An apparatus as set forth in claim 9 wherein said screw means includes a pair of parallel screws and said drive means includes separate drive means to rotate each of said parallel screws and means interconnecting said separate screw means to synchronize rotation of said screws.

References Cited

UNITED STATES PATENTS

| | | | |
|---|---|---|---|
| 612,413 | 10/1898 | Guernsey | 212—17 |
| 1,768,542 | 7/1930 | Clausing | 212—17 |
| 2,036,386 | 4/1936 | Anderson | 212—48 X |
| 2,567,083 | 9/1951 | Strickle | 212—21 |
| 2,792,130 | 5/1957 | Fetchko | 212—10 X |
| 2,796,180 | 6/1957 | Rose | 214—14 |
| 3,146,898 | 9/1964 | Kersting | 214—14 |

FOREIGN PATENTS

| | | |
|---|---|---|
| 1,210,405 | 9/1959 | France. |
| 1,160,151 | 8/1959 | Germany. |
| 1,169,099 | 12/1959 | Germany. |

EVON C. BLUNK, *Primary Examiner.*

SAMUEL F. COLEMAN, *Examiner.*

M. L. AJEMAN, *Assistant Examiner.*

UNITED STATES PATENT OFFICE

CERTIFICATE OF CORRECTION

Patent No. 3,339,707                      September 5, 1967

Carl Ludwig

It is hereby certified that error appears in the above numbered patent requiring correction and that the said Letters Patent should read as corrected below.

Column 8, line 40, before "carriage" insert -- boom on said --.

Signed and sealed this 22nd day of October 1968.

(SEAL)
Attest:

Edward M. Fletcher, Jr.                    EDWARD J. BRENNER
Attesting Officer                          Commissioner of Patents

Disclaimer 3,339,707.—*Carl Ludwig*, Cleveland, Ohio. MATERIAL HANDLING APPARATUS. Patent dated Sept. 5, 1967. Disclaimer filed Oct. 16, 1970, by the assignee, *McDowell-Wellman Engineering Company*.
Hereby enters this disclaimer to claims 1, 2 and 3 of said patent.
[*Official Gazette December 8, 1970.*]